US010001093B2

(12) United States Patent
Nola

(10) Patent No.: US 10,001,093 B2
(45) Date of Patent: Jun. 19, 2018

(54) INTAKE MANIFOLD HAVING SLOSH PREVENTION BAFFLES

(71) Applicant: Ford Global Technologies, LLC, Dearborn, MI (US)

(72) Inventor: Gary Nola, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 15/002,553

(22) Filed: Jan. 21, 2016

(65) Prior Publication Data

US 2017/0211527 A1 Jul. 27, 2017

(51) Int. Cl.
| | |
|---|---|
| *F02M 35/104* | (2006.01) |
| *F02M 35/10* | (2006.01) |
| *F02M 35/116* | (2006.01) |
| *F02M 35/16* | (2006.01) |
| *F02M 35/08* | (2006.01) |

(52) U.S. Cl.
CPC .... *F02M 35/10052* (2013.01); *F02M 35/088* (2013.01); *F02M 35/104* (2013.01); *F02M 35/10242* (2013.01); *F02M 35/10262* (2013.01); *F02M 35/10321* (2013.01); *F02M 35/116* (2013.01); *F02M 35/16* (2013.01); *F02M 35/168* (2013.01); *Y02T 10/146* (2013.01)

(58) Field of Classification Search
CPC ....... F02M 35/10052; F02M 35/10262; F02M 35/1011; F02M 35/10091; F02M 35/10131
USPC .......................... 123/184.24, 184.42, 184.34, 123/184.47–184.51
See application file for complete search history.

(56) References Cited

U.S. PATENT DOCUMENTS

| | | | | |
|---|---|---|---|---|
| 6,216,656 | B1 * | 4/2001 | Hada ................ | F02M 35/10039 123/184.34 |
| 8,997,708 | B2 * | 4/2015 | Sekiguchi ............. | F02M 35/10 123/184.21 |
| 2004/0194750 | A1 * | 10/2004 | Tanikawa ......... | F02M 35/10039 123/184.42 |
| 2006/0249115 | A1 * | 11/2006 | Hashimoto ...... | F02M 35/10039 123/184.55 |
| 2011/0232598 | A1 * | 9/2011 | Harada .................. | F02M 29/00 123/184.47 |

(Continued)

FOREIGN PATENT DOCUMENTS

| | | |
|---|---|---|
| CN | 2077030 U | 5/1991 |
| JP | 2004124831 A | 4/2004 |

*Primary Examiner* — Marguerite McMahon
(74) *Attorney, Agent, or Firm* — LeClairRyan

(57) ABSTRACT

A method and system to restrict the flow of accumulated liquid water from the intake manifold into the cylinders of an internal combustion engine by reducing the velocity of contained liquid water as it moves through the containment feature during vehicle maneuvering are disclosed. The body of the intake manifold includes a water containment feature having a water containment reservoir having an open upper portion and water-restricting interior walls. A water passageway is provided in each interior wall. The water passageway may be of any of several shapes, including a V-shape notch extending from the top of the wall. The interior wall is a central interior wall and the containment reservoir further includes an intermediate interior wall between the side walls that intersects the central interior wall. The water passageway is formed in at least one of the interior walls and may be formed in all of the walls.

19 Claims, 5 Drawing Sheets

(56) References Cited

U.S. PATENT DOCUMENTS

2012/0291741 A1* 11/2012 Ito .................. F02M 35/10052
123/184.47
2015/0285129 A1  10/2015 Dziubinschi et al.

* cited by examiner

INTAKE MANIFOLD HAVING SLOSH PREVENTION BAFFLES

TECHNICAL FIELD

The disclosed inventive concept relates to an intake manifold for an internal combustion engine. More particularly, the disclosed inventive concept relates to a method and system to slow the movement of accumulated liquid water within a containment feature, thus restricting flow of liquid water from the intake manifold into the cylinders of an internal combustion engine. The disclosed method and system incorporates a water management cavity formed in the base of the intake manifold. The water management cavity includes notched walls that reduce the velocity of contained liquid water as it travels in the containment feature during vehicle maneuvering.

BACKGROUND OF THE INVENTION

The intake manifold of a running internal combustion engine generally operates under negative pressure by which an air-fuel mixture is drawn through the intake manifold and into the cylinders. Because of the pressure differential between the intake manifold and the ambient air, it is possible for liquid water to enter and accumulate in the intake manifold. An example of such a situation arises where the vehicle passes through deep standing water. Another example of such a situation arises during times of excessive rain.

If even a small amount of accumulated liquid water enters one or more of the cylinders, an engine misfire can result. The entry of liquid water into the engine may also cause the failure of one or more sensors, such as the throttle position sensor, as some sensors are sensitive to the presence of water. If a larger amount of water enters a cylinder, engine damage in the form of a bent or broken connecting rod may result. This is the case because liquid water is not compressible, and when the piston moves toward the top of the combustion chamber during the compression stroke, even a small amount of liquid water can provide sufficient non-compressive mass to resist the free movement of the piston.

In an effort to restrict the inflow of liquid water from the intake manifold into the cylinders, water containment features have been introduced into the lower portion of the manifold. However, known containment features still allow liquid water to enter the cylinders, particularly when the vehicle is moving. Specifically, during acceleration, the velocity of the constrained water increases, thus increasing the likelihood that the liquid water will enter one or more of the engine's cylinders, thus causing misfiring, sensor failure, and engine damage as noted above.

Accordingly, as in so many areas of vehicle technology there is room for improvement related to methods and systems for restricting the flow of liquid water from the intake manifold into the cylinders of an internal combustion engine.

SUMMARY OF THE INVENTION

The disclosed inventive concept overcomes the problems associated with known methods and systems for minimizing or eliminating the passage of liquid water from the intake manifold into the cylinders of an internal combustion engine. Particularly, the disclosed inventive concept provides a liquid water containment feature that restricts the flow of liquid water from the intake manifold into the cylinders of an internal combustion engine by reducing the velocity of contained liquid water as it moves through the containment feature during vehicle maneuvering.

The disclosed inventive concept provides a method and system for an internal combustion engine that includes an intake manifold having a manifold body with an interior plenum. Intake runners extend from the body and are in fluid communication with the interior plenum.

The body of the intake manifold includes a lower end that incorporates a water containment feature. The water containment feature includes a water containment reservoir having a substantially open upper portion and a water-restricting interior wall. A water passageway is provided in the interior wall. The water passageway may be of any of several shapes, including a V-shape notch extending from the top of the wall.

In one embodiment, the interior wall is a central interior wall and the containment reservoir further includes an intermediate interior wall between the side walls that intersects the central interior wall. The water passageway is formed in at least one of the interior walls and may be formed in all of the walls.

The intake manifold body may be a single piece or may be two separately-formed but attached components including an upper manifold portion to which the water containment reservoir is attached. The interior walls may be integrally formed with the water containment reservoir. The intake manifold body may be made of a variety of materials but is preferably formed from molded plastic.

The length, number and angle of the interior walls as well as the number, position and size of the water passageways may be selectively adjusted thus making the system of the disclosed inventive concept tunable.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
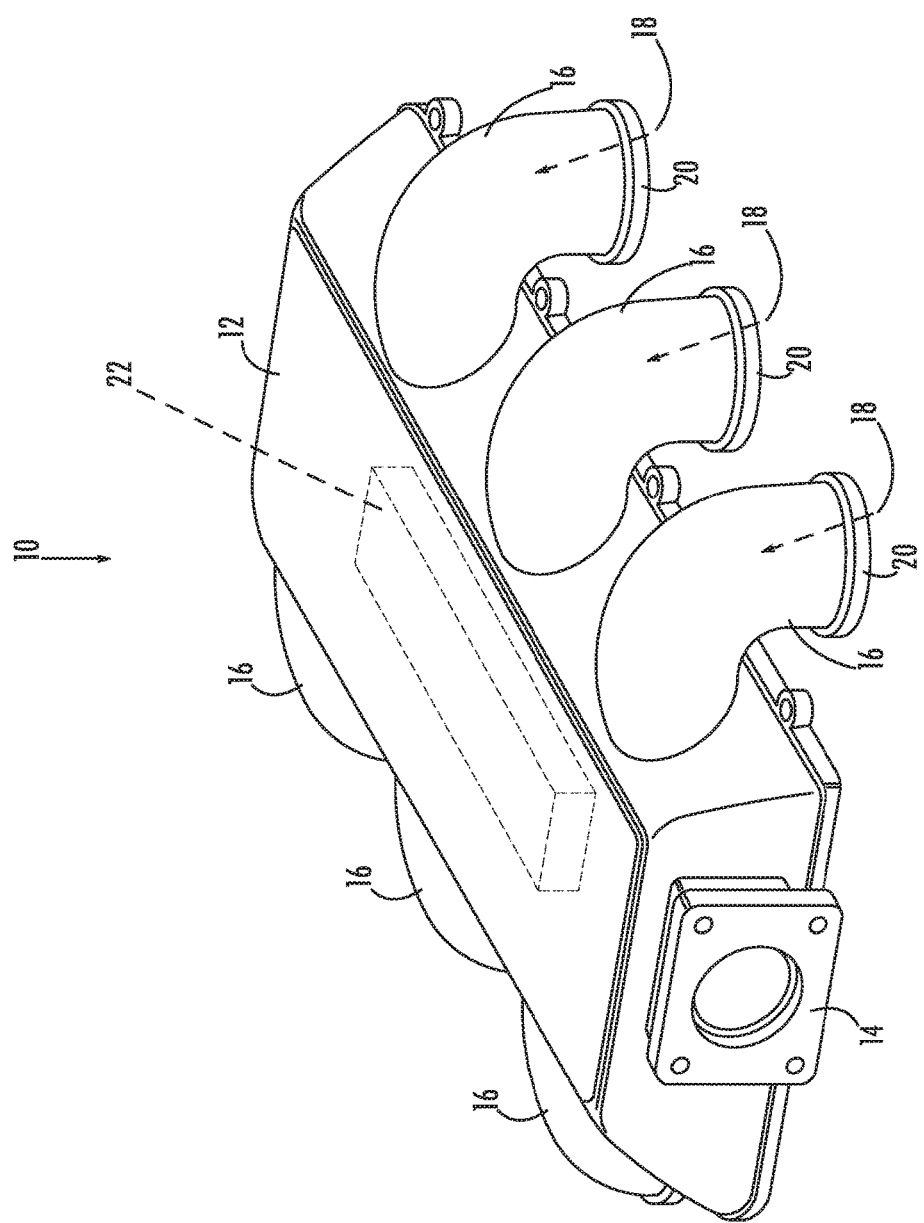
FIG. 1 illustrates a perspective view of an intake manifold for an internal combustion engine having a water containment feature shown in broken lines.

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a method and system that restricts or eliminates the passage of liquid water from the intake manifold into the cylinders of an internal combustion engine. In general, the intake manifold according to the disclosed inventive concept provides a water containment feature having a series of baffles that reduce the velocity of liquid water constrained in the water containment feature during vehicle maneuvering. By reducing the velocity of the liquid water, the likelihood of the water traveling into a cylinder is reduced or eliminated. Importantly, the disclosed inventive concept accomplishes the objective of restricting or eliminating the flow of liquid water into the cylinders of the engine while at the same time meeting engine system functional requirements.

Referring to FIG. 1, an intake manifold 10 according to the disclosed inventive concept is illustrated. The intake manifold 10 includes a manifold body 12 having an air-fuel intake flange 14 formed thereon. An air-fuel mixing device, such as a throttle body (not shown), is attached to the air-fuel intake flange 14.

The intake manifold 10 includes a plurality of runners 16. Each of the runners 16 extends outward from the manifold body 12. Within each runner 16 is an air-fuel passage 18. Each air-fuel passage 18 is in fluid communication at one end with the body 12 of the intake manifold 10 and at another end 20 with an outlet port. When the intake manifold 10 is attached to an internal combustion engine, each outlet port is placed in communication with a respective engine cylinder port.

A water containment feature is integrally provided with the intake manifold 10. Particularly, a water management cavity 22 is formed in the base of the intake manifold 10. The water management cavity 22 is shown in broken lines in FIG. 1.

Figure 2:
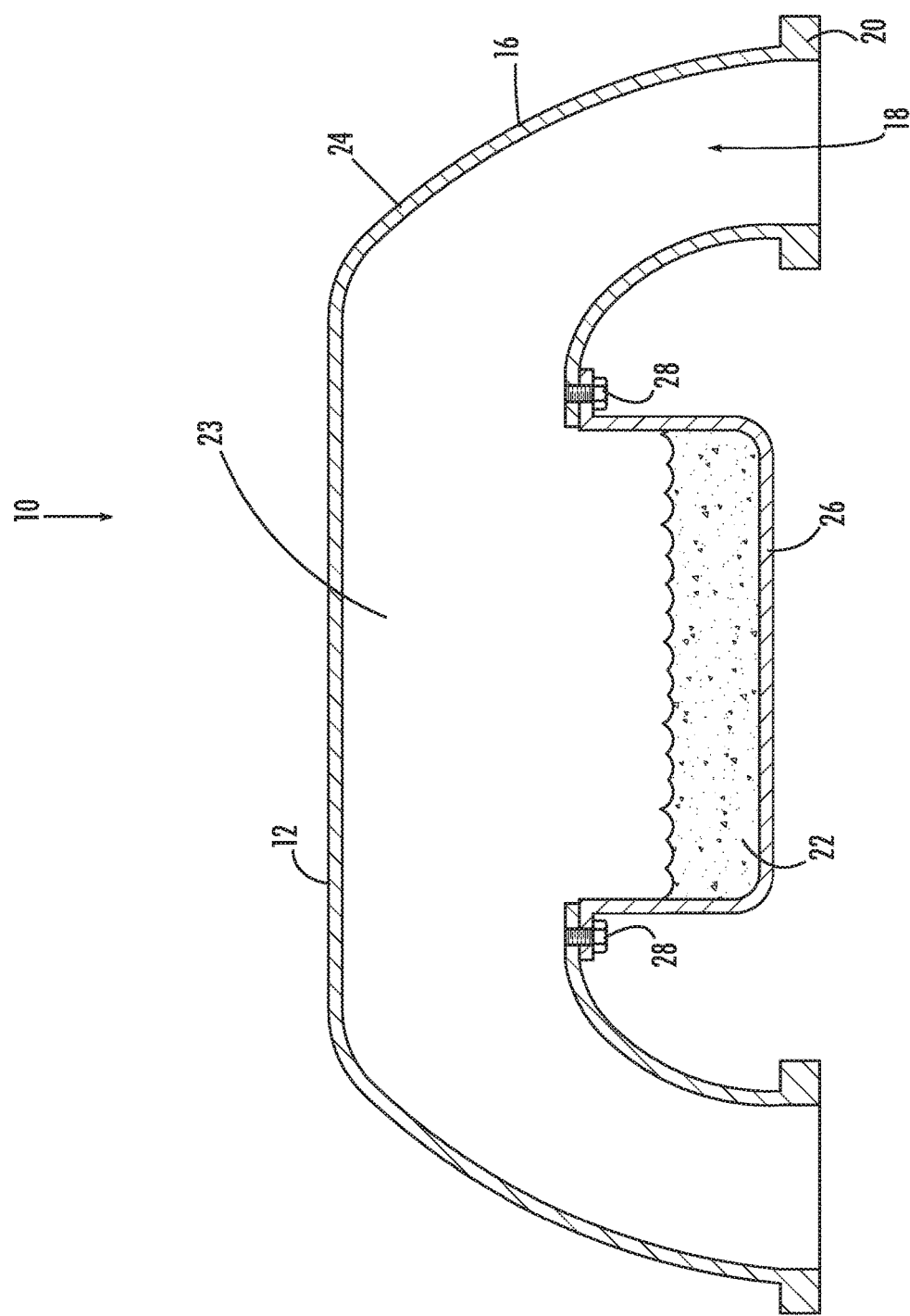
FIG. 2 illustrates a sectional view of an intake manifold according to a first embodiment of the disclosed inventive concept.

FIG. 2 illustrates a sectional view of the intake manifold 10 according to the disclosed inventive concept. The intake manifold 10 may be composed of any one of a variety of materials including, but not limited to, a rigid plastic. Formed within the manifold body 12 is a plenum 23. The manifold body 12 of the intake manifold 10 may be of one-piece construction or may be formed from two separate portions as illustrated. The portions include an upper body portion 24 and a water containment reservoir 26. The water containment reservoir 26 defines the water management cavity 22.

If formed from separate components, the water containment reservoir 26 is attached to the upper body portion 24 by any of a variety of methods. Methods of attachment include, without limitation, plastic welding, adhesive bonding or, as illustrated herein, mechanical fastening in the form of mechanical fasteners 28.

The size and shape of the water containment reservoir 26 may be selectively adjusted thus making the system of the disclosed inventive concept highly tunable. For example, the deeper the water containment reservoir 26, the less likely that water will flow from the intake manifold 10 into the cylinders. However, the depth of the water containment reservoir 26 must be balanced against the increased space required for an intake manifold having a deeper base.

Figure 3:
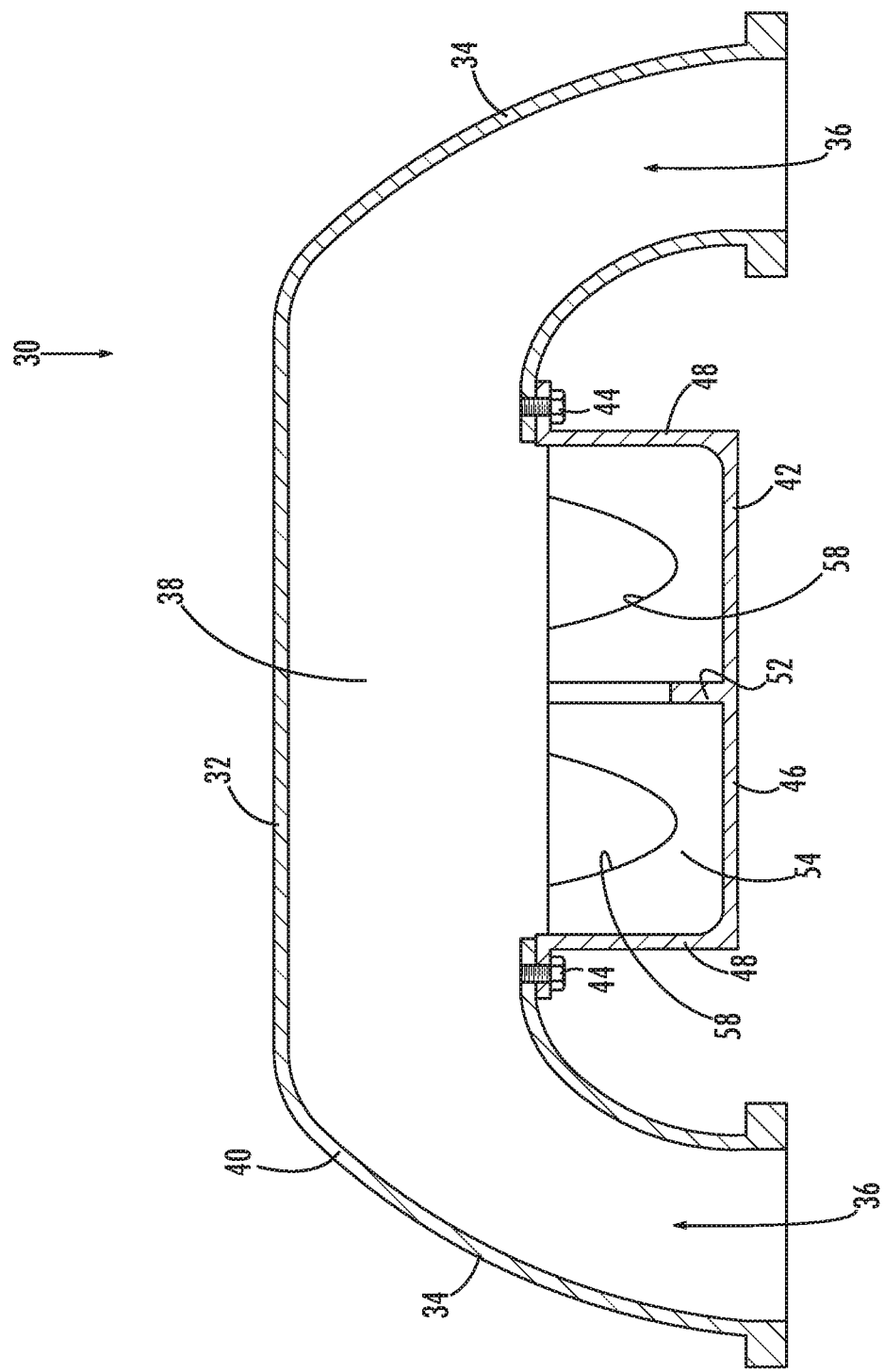
FIG. 3 illustrates a sectional view of an intake manifold according to a second embodiment of the disclosed inventive concept.
Figure 4:
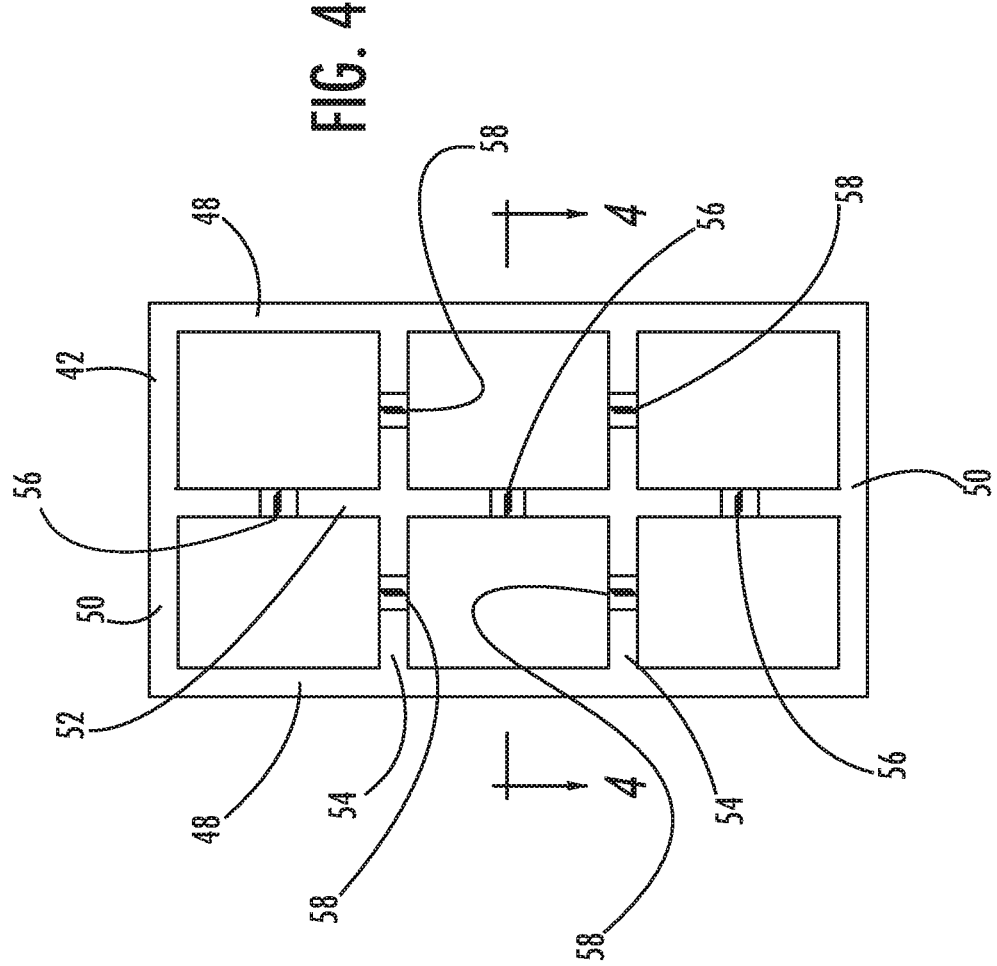
FIG. 4 illustrates a top plan view of the containment feature of the embodiment illustrated in FIG. 3.
Figure 5:
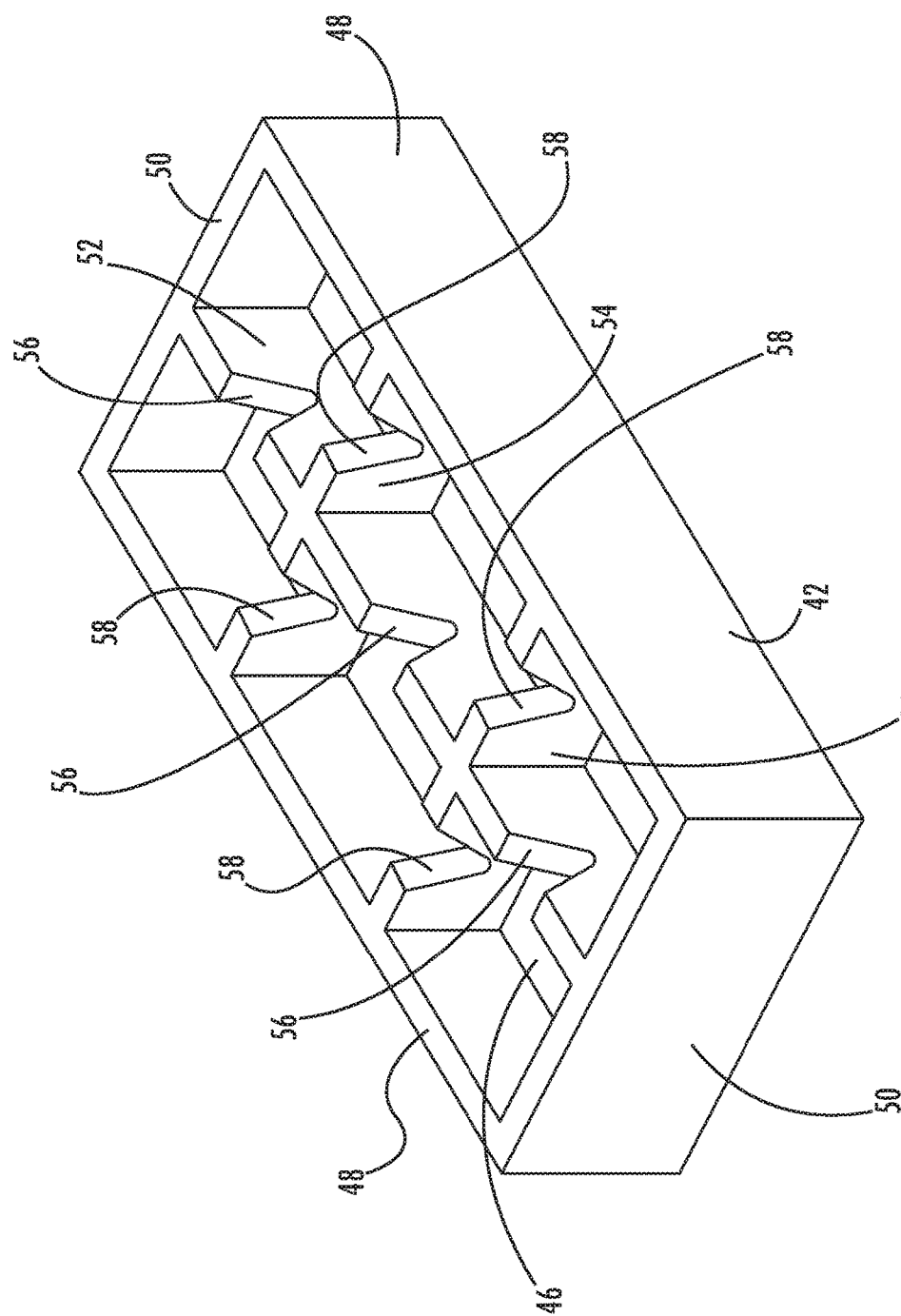
FIG. 5 illustrates a perspective view of the containment feature of the embodiment illustrated in FIG. 3.

An alternate arrangement of the water containment feature of the disclosed inventive concept is illustrated in FIGS. 3 through 5. Particularly, and with respect to FIG. 3, an intake manifold 30 for an internal combustion engine is illustrated. The intake manifold 30 includes a manifold body 32 having a plurality of runners 34. Each of the runners 34 extends outward from the manifold body 32. Within each runner 34 is an air-fuel passage 36. Formed within the manifold body 32 is a plenum 38.

Like the intake manifold 10 discussed above, the intake manifold 30 may be composed of any one of a variety of materials including, but not limited to, a rigid, molded plastic. The body 32 of the intake manifold 30 is preferably composed of two portions which, as illustrated, may be separate components. The portions include an upper body portion 40 and a water containment reservoir 42.

If formed from separate components, the water containment reservoir 42 is attached to the upper body portion 40 by any of a variety of methods. Such methods include, without limitation, plastic welding, adhesive bonding or, as illustrated herein, mechanical fastening in the form of mechanical fasteners 44.

The water containment reservoir 42 includes a series of baffles to reduce the velocity of water constrained in the water containment reservoir 42. FIGS. 3 through 5 illustrate the baffles. Particularly, the water containment reservoir 42 includes a bottom wall 46, a pair of opposed side walls 48, and a pair of opposed end walls 50. A central interior wall 52 extends between the opposed end walls 50 and is parallel to the side walls 48. A pair of intermediate interior walls 54 extends between the opposed side walls 48 and intersect the central interior wall 52.

The central interior wall 52 and the pair of intermediate interior walls 54 may be integrally formed as a singled molded part with the bottom wall 46, the opposed side walls 48, and the opposed end walls 50. Alternatively, the central interior wall 52 and the pair of intermediate interior walls 54 may be formed separately from the bottom wall 46, the opposed side walls 48, and the opposed end walls 50 and may be later added and attached by any known method, including by an adhesive. It is to be understood that the height, number and spacing of the central interior wall 52 and the intermediate interior walls 54 may be other than that as illustrated and may be greater or lesser than the number shown.

One or more of the central interior walls 52 and the pair of intermediate interior walls 54 include a water flow-restricting passageway, preferably in the form of a notch, that works in conjunction with the walls of the containment reservoir 42 to reduce the velocity of the constrained water. Specifically, notches 56 are formed in the central interior wall 52 and notches 58 are formed in the pair of intermediate interior walls 54. As illustrated in FIGS. 3 and 5, the notches 56 and 58 are V-shaped, although it is to be understood that other shapes, such as squared and rounded, may be used as well. Preferably, but not absolutely, the water passageways extend from the top of the interior wall in which they are formed.

As with possible variations of the height, number and spacing of the central interior wall 52 and the intermediate interior walls 54, the number, placement and shape of the notches 56 and 58 may be varied. By adjusting these variables, particularly as to the shape, number and sizes of the notches 56 and 58, the velocity of the constrained water may be reduced or dampened to a desired degree. This ability to fine-tune the water flow-dampening characteristics of the disclosed inventive concept provides designers with maximum flexibility without compromising engine performance.

The disclosed invention as set forth above overcomes the challenges faced by designers seeking to restrict or eliminate the flow of liquid water from the intake manifold into one or more cylinders of an internal combustion engine. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An intake manifold for an internal combustion engine comprising:
    a manifold body having an interior plenum, said interior plenum having a lower end;
    a water containment feature associated with said manifold body, said water containment feature including a water containment reservoir having a substantially open upper portion, a pair of opposed side walls, a pair of opposed end walls, and a central interior wall spaced apart from said pair of opposed side walls and extending between said pair of opposed end walls, said central interior wall having an upper end and a water passageway extending into said central interior wall from said upper end.

2. The intake manifold of claim 1, wherein said water passageway is a V-shape notch.

3. The intake manifold of claim 1, wherein said water containment reservoir further includes a bottom wall.

4. The intake manifold of claim 3, wherein said containment reservoir further includes an interior wall extending between said pair of opposed side walls and intersecting said central interior wall.

5. The intake manifold of claim 4, wherein said water passageway is formed in one of said interior wall or said central interior wall.

6. The intake manifold of claim 4, wherein said water passageway is formed in each of said interior wall and said central interior wall.

7. The intake manifold of claim 1, wherein said manifold body includes an upper manifold portion to which said water containment reservoir is attached.

8. The intake manifold of claim 7, wherein said central interior wall is integrally formed with said water containment reservoir.

9. An intake manifold for an internal combustion engine comprising:
    a manifold body having an interior plenum, said interior plenum having a lower end;
    a water containment feature associated with said manifold body, said water containment feature including a water containment reservoir having a bottom wall, a pair of opposed side walls, a pair of opposed end walls, and a central interior wall extending between one of said pair of opposed end walls or said pair of opposed side walls and being spaced apart from the other of said pair of opposed end walls or said pair of opposed side walls, said central interior wall having an upper end opposite said bottom wall and a water passageway extending into said central interior wall from said upper end.

10. The intake manifold of claim 9 further including an interior wall intersecting said central interior wall.

11. The intake manifold of claim 10, wherein each of said central interior wall and said interior wall includes a water passageway notch formed therein.

12. An intake manifold for an internal combustion engine comprising:
    a manifold body having an interior plenum, said interior plenum having a lower end;
    a water containment feature associated with said manifold body, said water containment feature including a water containment reservoir having a substantially open upper portion, side walls, a central interior wall, and an interior wall extending between said side walls and intersecting said central interior wall, said interior wall having a water passageway formed therein.

13. The intake manifold of claim 12, wherein said water passageway is a V-shape notch.

14. The intake manifold of claim 12, wherein said interior wall has a top end and wherein said water passageway extends from said top end of said interior wall.

15. The intake manifold of claim 12, wherein said water containment reservoir further includes a bottom wall, a pair of opposed side walls, and a pair of opposed end walls and wherein said central interior wall extends between said pair of opposed end walls.

16. The intake manifold of claim 12 further including a plurality of interior walls and wherein said water passageway is formed in one of said plurality of interior walls.

17. The intake manifold of claim 12 further including a plurality of interior walls and wherein said water passageway is formed in each interior wall of said plurality of interior walls.

18. The intake manifold of claim 12, wherein said manifold body includes an upper manifold portion to which said water containment reservoir is attached.

19. The intake manifold of claim 18, wherein said interior wall is integrally formed with said water containment reservoir.

* * * * *